No. 756,881. PATENTED APR. 12, 1904.
U. NEHRING.
LENS.
APPLICATION FILED FEB. 9, 1904.
NO MODEL.

*lens is moved during exposure to focus sharply each color*

WITNESSES:
Bed. W. Barnaclo
Abram Pinkerton.

Ulrich Nehring. INVENTOR

BY
Dr. Ralph Julian Sachers
ATTORNEY

No. 756,881.                                                      Patented April 12, 1904.

UNITED STATES PATENT OFFICE.

ULRICH NEHRING, OF NEW YORK, N. Y., ASSIGNOR TO THE SCIENTIFIC LENS CO., OF NEW YORK, N. Y., A CORPORATION OF NEW YORK.

LENS.

SPECIFICATION forming part of Letters Patent No. 756,881, dated April 12, 1904.

Application filed February 9, 1904. Serial No. 192,744. (No model.)

*To all whom it may concern:*

Be it known that I, ULRICH NEHRING, a citizen of the United States, residing in New York, in the county of New York and State of New York, have invented certain new and useful Improvements in Lenses, of which the following is a specification.

The present invention relates to lenses, and more particularly to lenses used in producing photographic negatives.

It is a well-known fact in the art of photography that lenses are subject to spherical and chromatic aberration, producing a difference in the focal distance between the edge rays of a lens and the center rays and between the more refrangible violet rays and the less refrangible red rays. These defects become apparent in photography by causing differently sharp or distorted pictures or by not giving a true record of the correct color value of the original object. It has been tried heretofore to overcome these defects for the production of evenly-sharp pictures by moving the entire photographic lens or lens system to and from the sensitive surface during the time of exposure.

The present invention has for its object to accomplish this effect by changing the focal distance of a lens or lens set instead of simply moving the entire lens to and from the sensitive surface; and it consists of the construction illustrated in the accompanying drawings, in which—

Figure 1:
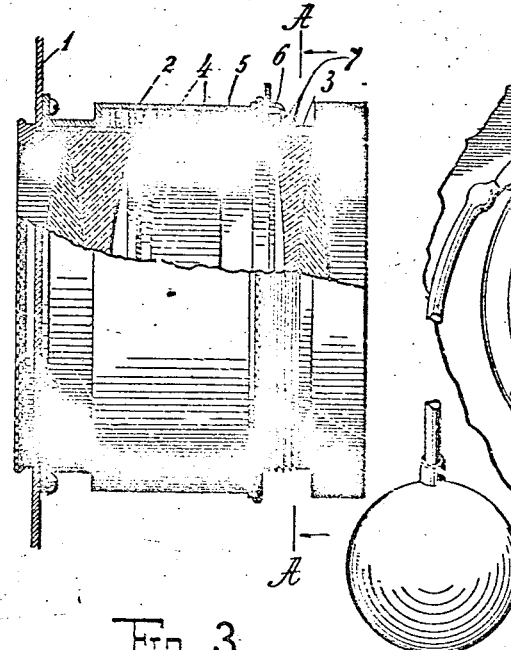
Figure 2:
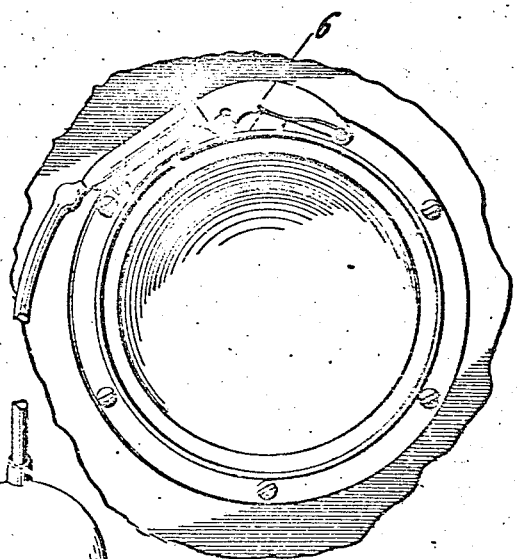
Figure 3:
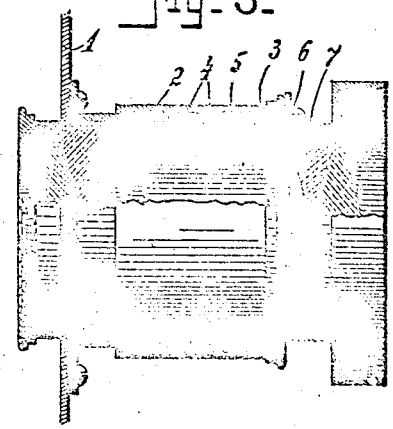

Figure 1 is a side view, partly in section, of a photographic lens; Fig. 2, a cross-section of the same in the line A A of Fig. 1, and Figs. 3 and 4 similar views as Fig. 1 of several modifications.

In more fully describing the underlying invention it is well to keep in mind that the focus of a lens is that point in the optical axis of the lens in which parallel rays meet after emergence and that the focal distance of a lens is the distance between the focus and the optical center of the lens. The equivalent focus of a lens system is that point in the optical axis of a series or plurality of lenses in which parallel rays meet after passing all the lenses, and equivalent focal distance is the distance between the equivalent focus and the optical center of a theoretical or phantom lens representing the joint action of the whole series or plurality of lenses forming the system.

In the drawings forming part of the present application, 1 is the ordinary front board or lens-board of a photographic camera. Secured to the same by a lens-ring or other means is the outer casing 2 of the lens, which carries one lens or lens set, forming a part of the entire system. 3 is the inner casing, carrying another lens or lens set and telescoping the outer casing. A suitable space is provided between the two casings for receiving an elastic or resilient means, such as a coiled spring 4, Figs. 1 and 3, which when operating cause a change of the distance between the lenses or lens sets forming the system and, therefore, a change of the focal distance.

It is to be understood that the resilient means may be adapted to operate by expansion as well as by contraction. The coiled spring 4, for instance, when used in the device illustrated in Fig. 1 may first be compressed and then act on the lens-carrying casings by expansion, thereby lessening the distance between the lenses, and consequently changing the focal distance of the system. It is to be understood that the resilient means. If the same spring is fastened to the lens-casings and first expanded, it will act by contraction, and thereby increase the distance between the lenses. These elastic or resilient means may be located between the lenses, as shown in the drawings, or they may be outside of one or the other lens.

Figure 4:
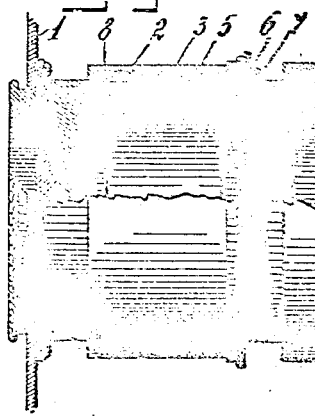

Fig. 4 illustrates a device operated by means of a medium—such as air, oil, glycerin, &c.—which is pressed into or removed from a suitable space 8 between the lens-casings, and thereby causing a variation between the lens distance and a corresponding variation of the focal distance. A packing 5, consisting of a leather washer, preferably impregnated with oil or glycerin or other means, forms a nearly air-tight closure between the casings and operates to prevent a sudden movement of the casing released relatively to the other casing and causes a gradual movement of the same. A release 6, preferably spring-controlled and operated by the well-known pneumatic-ball device, is secured to the outer casing and coöperates with teeth or grooves 7 on the inner casing.

Instead of using elastic or resilient means for varying the focal distance of a lens set or system, a rack-and-pinion device may be employed for moving one lens toward or from the other in connection with a suitable power device for working the rack and pinion.

In using the device the release 6 is set into such a tooth 7 as to cause when released the desired change of the distance between the lenses and the corresponding change of the equivalent focal distance. Taking, for instance, the device illustrated in Fig. 1, the front lens is pulled out a short distance and the coiled spring thereby expanded. The release 6 is set, for instance, in the first tooth. The object to be photographed is then focused in the ordinary way, and the shutter, which may be operated by the same bulb as the release 6, is opened, and during the time or duration of the photographic exposure one lens moves gradually without jerking toward or from the other lens, whereby the distance between the lenses is varied, causing a corresponding change of the focal distance or equivalent focal distance of the lens or lens system and producing a photographic negative of even sharpness and without distortion and giving a true record of the color values of the original object.

The method of employing the underlying invention has already been set forth in the copending application for Letters Patent, Serial No. —, filed February 4, 1904.

What is claimed as new and useful, and desired to be secured by United States Letters Patent, is—

1. The combination with a lens, of means for changing the focal distance of the lens during the time of exposure.

2. The combination with a lens, of means for gradually changing the focal distance of the lens during the time of exposure.

3. The combination with a plurality of lenses, of means for changing the equivalent focal distance of the lenses during the time of exposure.

4. The combination with a plurality of lenses, of means for gradually changing the equivalent focal distance of the lenses, during the time of exposure.

5. The combination with a plurality of lenses, of means for changing the location of the focus of one lens or lens set relatively to the location of the focus of another lens or lens set during the time of exposure.

6. The combination with a plurality of lenses, of means for gradually changing the location of the focus of one lens or lens set relatively to the location of the focus of another lens or lens set during the time of exposure.

7. The combination with a plurality of lenses, of elastic or resilient means for changing the location of the focus of one lens or lens set relatively to the location of the focus of another lens or lens set during the time of exposure.

8. The combination with a plurality of lenses, of elastic or resilient means for gradually changing the location of the focus of one lens or lens set relatively to the location of the focus of another lens or lens set during the time of exposure.

9. The combination with a plurality of lenses, of means for changing the distance between the lenses during the time of exposure.

10. The combination with a plurality of lenses, of means for gradually changing the distance between the lenses during the time of exposure.

11. The combination with a lens system comprising a plurality of lenses or lens sets, of elastic or resilient means for changing the distance between the lenses during the time of exposure.

12. The combination with a lens system comprising a plurality of lenses or lens sets, of elastic or resilient means for gradually changing the distance between the lenses during the time of exposure.

13. The combination with a lens, of means for changing the focal distance of the lens during the time of exposure, and means for adjusting the amount of the change.

14. The combination with a lens, of means for gradually changing the focal distance of the lens during the time of exposure, and means for adjusting the amount of the change.

15. The combination with a plurality of lenses, of means for changing the equivalent focal distance of the lenses during the time of exposure, and means for adjusting the amount of the change.

16. The combination with a plurality of lenses, of means for gradually changing the equivalent focal distance of the lenses during the time of exposure, and means for adjusting the amount of the change.

17. The combination with a plurality of lenses, of means for gradually changing the location of the focus of one lens or lens set relatively to the location of the focus of another lens or lens set, and means for adjusting the amount of the change.

18. The combination with a plurality of lenses, of means for changing the location of the focus of one lens or lens set relatively to the location of the focus of another lens or lens set during the time of exposure, and means for adjusting the amount of change.

19. The combination with a plurality of lenses, of means for gradually changing the location of the focus of one lens or lens set relatively to the location of the focus of another lens or lens set during the time of exposure, and means for adjusting the amount of the change.

20. The combination with a plurality of lenses, of elastic or resilient means for changing the location of the focus of one lens or lens set relatively to the location of the focus of another lens or lens set during the time of exposure, and means for adjusting the amount of the change.

21. The combination with a plurality of lenses, of elastic or resilient means for gradually changing the location of the focus of one lens or lens set relatively to the location of the focus of another lens or lens set during the time of exposure, and means for adjusting the amount of the change.

22. The combination with a plurality of lenses, of means for changing the distance between the lenses during the time of exposure, and means for adjusting the amount of change.

23. The combination with a plurality of lenses, of means for gradually changing the distance between the lenses during the time of exposure, and means for adjusting the amount of the change.

24. The combination with a plurality of lenses, of elastic or resilient means for changing the distance between the lenses during the time of exposure, and means for adjusting the amount of change.

25. The combination with a plurality of lenses, of elastic or resilient means for gradually changing the distance between the lenses during the time of exposure, and means for adjusting the amount of the change.

26. The combination with a plurality of lenses or lens sets, of a casing for each lens or lens set, one casing surrounding the other and capable of movement relatively thereto, of means for causing said movement, and means for adjusting the amount of said movement.

27. The combination with a plurality of lenses or lens sets, of a casing for each lens or lens set and telescoping each other, means for causing said movement during the time of exposure, and means for adjusting the amount of said movement.

28. The combination with a plurality of lenses or lens sets, of a casing for each lens or lens set and telescoping each other, means for causing a gradual movement of one of the casings during the time of exposure, and means for adjusting the amount of the movement.

29. The combination with a plurality of lenses or lens sets, of a casing for each lens or lens set, one casing telescoping the other and slidable therein, elastic or resilient means for causing said movement during the time of exposure, and means for adjusting the amount of said movement.

30. The combination with a plurality of lenses or lens sets, of a casing for each lens or lens set, one casing telescoping the other and movable therein, elastic or resilient means for causing gradually said movement during the time of exposure, and means for adjusting the amount of said movement.

Signed at New York, in the county of New York and State of New York, this 1st day of February, 1904.

ULRICH NEHRING.

In presence of—
JOHN O. SEIFERT,
ABRAM PINKERTON.